(12) United States Patent
Kang et al.

(10) Patent No.: US 12,074,280 B2
(45) Date of Patent: Aug. 27, 2024

(54) ALL-SOLID SECONDARY BATTERY AND METHOD OF MANUFACTURING ALL-SOLID SECONDARY BATTERY

(71) Applicants: SAMSUNG ELECTRONICS CO., LTD., Suwon-si (KR); Samsung SDI Co., Ltd., Yongin-si (KR)

(72) Inventors: Hyorang Kang, Anyang-si (KR); Minsuk Lee, Suwon-si (KR); Dooyeon Lee, Yongin-si (KR)

(73) Assignees: SAMSUNG ELECTRONICS CO , LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 276 days.

(21) Appl. No.: 17/844,832

(22) Filed: Jun. 21, 2022

(65) Prior Publication Data

US 2022/0328870 A1  Oct. 13, 2022

Related U.S. Application Data

(63) Continuation of application No. 16/703,039, filed on Dec. 4, 2019, now Pat. No. 11,411,246.

(30) Foreign Application Priority Data

Dec. 6, 2018 (KR) .................. 10-2018-0156273
Oct. 28, 2019 (KR) .................. 10-2019-0134804

(51) Int. Cl.
*H01M 10/0562* (2010.01)
*H01M 4/36* (2006.01)
(Continued)

(52) U.S. Cl.
CPC ....... *H01M 10/0562* (2013.01); *H01M 4/366* (2013.01); *H01M 10/052* (2013.01);
(Continued)

(58) Field of Classification Search
CPC .......... H01M 10/0562; H01M 10/052; H01M 10/0565; H01M 4/366; H01M 2300/0065; H01M 2300/0068
See application file for complete search history.

(56) References Cited

U.S. PATENT DOCUMENTS 7,513,136 B2   4/2009  Laliberte et al.
7,993,782 B2   8/2011  Takada et al.
(Continued)

FOREIGN PATENT DOCUMENTS

CN      1691372 A    11/2005
CN      103190026 A   7/2013
(Continued)

OTHER PUBLICATIONS

William D. Richards et al., "Interface Stability in Solid-State Batteries," Chemistry of Materials, Dec. 7, 2015, pp. 266-273, vol. 28.
(Continued)

*Primary Examiner* — Matthew J Merkling
(74) *Attorney, Agent, or Firm* — CANTOR COLBURN LLP

(57) ABSTRACT

An all-solid secondary battery and a method of manufacturing the all-solid secondary battery. The all-solid secondary battery includes: an anode including an anode current collector and a first anode active material layer; a cathode including a cathode active material layer; and a solid electrolyte layer between the anode and the cathode, wherein the first anode active material layer includes an anode active material and an ionic compound, the ionic compound includes a binary compound, a ternary compound, or a combination thereof, and the ionic compound does not include a plurality of sulfur (S) atoms.

28 Claims, 3 Drawing Sheets

(51) Int. Cl.
*H01M 10/052* (2010.01)
*H01M 10/0565* (2010.01)

(52) U.S. Cl.
CPC .............. *H01M 10/0565* (2013.01); *H01M 2300/0065* (2013.01); *H01M 2300/0068* (2013.01)

(56) References Cited

U.S. PATENT DOCUMENTS

| | | | |
|---|---|---|---|
| 8,012,631 B2 | 9/2011 | Seino et al. | |
| 8,075,865 B2 | 12/2011 | Deiseroth et al. | |
| 8,658,317 B2 | 2/2014 | Weppner et al. | |
| 9,620,811 B2 | 4/2017 | Kambara et al. | |
| 9,728,808 B2 | 8/2017 | Sugiura et al. | |
| 9,812,734 B2 | 11/2017 | Miyashita et al. | |
| 9,929,433 B2 | 3/2018 | Kanno et al. | |
| 10,340,506 B2 | 7/2019 | Aihara et al. | |
| 2002/0172862 A1* | 11/2002 | Tamura | H01M 4/483 429/245 |
| 2005/0239917 A1 | 10/2005 | Nelson et al. | |
| 2005/0241137 A1 | 11/2005 | Suzuki et al. | |
| 2008/0241665 A1 | 10/2008 | Hiroshi | |
| 2009/0263725 A1 | 10/2009 | Balsara | |
| 2010/0209770 A1* | 8/2010 | Lim | H01M 4/505 429/207 |
| 2012/0052396 A1 | 3/2012 | Tsuchida et al. | |
| 2012/0276434 A1 | 11/2012 | Gaikwad et al. | |
| 2013/0004858 A1 | 1/2013 | Yamada et al. | |
| 2013/0011735 A1 | 1/2013 | Nelson et al. | |
| 2013/0260023 A1 | 10/2013 | Suyama et al. | |
| 2014/0011100 A1 | 1/2014 | Lee et al. | |
| 2014/0038054 A1 | 2/2014 | Takeshi et al. | |
| 2014/0082931 A1 | 3/2014 | Nishino et al. | |
| 2014/0087270 A1 | 3/2014 | Yoshida | |
| 2014/0162138 A1 | 6/2014 | Fujiki et al. | |
| 2014/0162141 A1 | 6/2014 | Fujiki et al. | |
| 2014/0356724 A1* | 12/2014 | Iwami | H01M 4/386 429/231.4 |
| 2014/0356732 A1 | 12/2014 | Zidan et al. | |
| 2015/0037688 A1 | 2/2015 | Otsuka et al. | |
| 2015/0093651 A1 | 4/2015 | Aihara et al. | |
| 2015/0118574 A1 | 4/2015 | Heidy et al. | |
| 2015/0147660 A1 | 5/2015 | Fujiki et al. | |
| 2015/0236343 A1 | 8/2015 | Xiao et al. | |
| 2016/0020487 A1 | 1/2016 | Yamada et al. | |
| 2016/0043392 A1 | 2/2016 | Fujiki et al. | |
| 2016/0064772 A1 | 3/2016 | Choi et al. | |
| 2016/0087306 A1 | 3/2016 | Lee et al. | |
| 2016/0093916 A1 | 3/2016 | Moon et al. | |
| 2016/0226097 A1 | 8/2016 | Wegner et al. | |
| 2016/0248093 A1 | 8/2016 | Sugiura et al. | |
| 2017/0047610 A1 | 2/2017 | Miara et al. | |
| 2017/0062829 A1 | 3/2017 | Ryu et al. | |
| 2017/0117583 A1 | 4/2017 | Matsuno et al. | |
| 2017/0317352 A1 | 11/2017 | Lee et al. | |
| 2017/0324076 A1* | 11/2017 | Lee | H01M 10/052 |
| 2017/0324097 A1 | 11/2017 | Lee et al. | |
| 2017/0338522 A1 | 11/2017 | Hu et al. | |
| 2018/0226633 A1 | 8/2018 | Fujiki et al. | |
| 2018/0316051 A1 | 11/2018 | Lee et al. | |
| 2019/0044186 A1 | 2/2019 | Kim et al. | |
| 2019/0157723 A1 | 5/2019 | Suzuki et al. | |
| 2019/0363403 A1 | 11/2019 | Liu et al. | |
| 2021/0384509 A1* | 12/2021 | Lee | H01M 4/62 |
| 2022/0384778 A1 | 12/2022 | Amiruddin et al. | |

FOREIGN PATENT DOCUMENTS

| | | |
|---|---|---|
| CN | 104253283 A | 12/2014 |
| CN | 104617254 A | 5/2015 |
| JP | 3065797 B2 | 7/2000 |
| JP | 2016039066 A | 3/2016 |
| KR | 1020160064942 A | 6/2016 |

OTHER PUBLICATIONS

Office Action issued Dec. 29, 2023 of CN Patent Application No. 201911225511.2.

\* cited by examiner

ALL-SOLID SECONDARY BATTERY AND METHOD OF MANUFACTURING ALL-SOLID SECONDARY BATTERY

CROSS-REFERENCE TO RELATED APPLICATION

This application is a continuation application of application Ser. No. 16/703,039, filed Dec. 4, 2019, which claims priority to and the benefit of Korean Patent Application No. 10-2018-0156273, filed on Dec. 6, 2018, in the Korean Intellectual Property Office, and Korean Patent Application No. 10-2019-0134804, filed on Oct. 28, 2019, in the Korean Intellectual Property Office, and all the benefits accruing therefrom under 35 U.S.C. § 119, the content of which is incorporated herein in its entirety by reference.

BACKGROUND

1. Field

The present disclosure relates to an all-solid secondary battery and a method of manufacturing the all-solid secondary battery.

2. Description of the Related Art

Batteries having high energy density and high safety may be developed in accordance with industrial standards. For example, lithium ion batteries may be used in the automotive field as well as in the fields of information-associated equipment and communication equipment. In the automotive field, safety of batteries is particularly important.
A lithium ion battery may use a liquid electrolyte including a flammable organic solvent, and thus there may be a risk of overheating and fire should a short circuit occur.

SUMMARY

Provided is an all-solid secondary battery having improved cycle characteristics due to suppression of side reactions of a solid electrolyte between an anode layer and a solid electrolyte layer, and a method of manufacturing the all-solid secondary battery.

Additional aspects will be set forth in part in the description which follows and, in part, will be apparent from the description, or may be learned by practice of the presented embodiments.

According to an aspect of an embodiment, an all-solid secondary battery includes: an anode including an anode current collector and a first anode active material layer; a cathode including a cathode active material layer; and a solid electrolyte layer between the anode and the cathode, wherein the first anode active material layer includes an anode active material and an ionic compound, the ionic compound includes a binary compound, a ternary compound, or a combination thereof, and the ionic compound does not include a plurality of sulfur (S) atoms.

According to an aspect of an embodiment, a method of manufacturing an all-solid secondary battery includes: providing an anode; providing a cathode; and providing a solid electrolyte layer between the anode and the cathode to thereby prepare a laminate; and pressing the laminate to manufacture the all-solid secondary battery, wherein the anode includes an anode current collector and a first anode active material layer, the first anode active material layer includes an anode active material and an ionic compound, the ionic compound includes a binary compound, a ternary compound, or a combination thereof, and the ionic compound does not include a plurality of sulfur (S) atoms.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
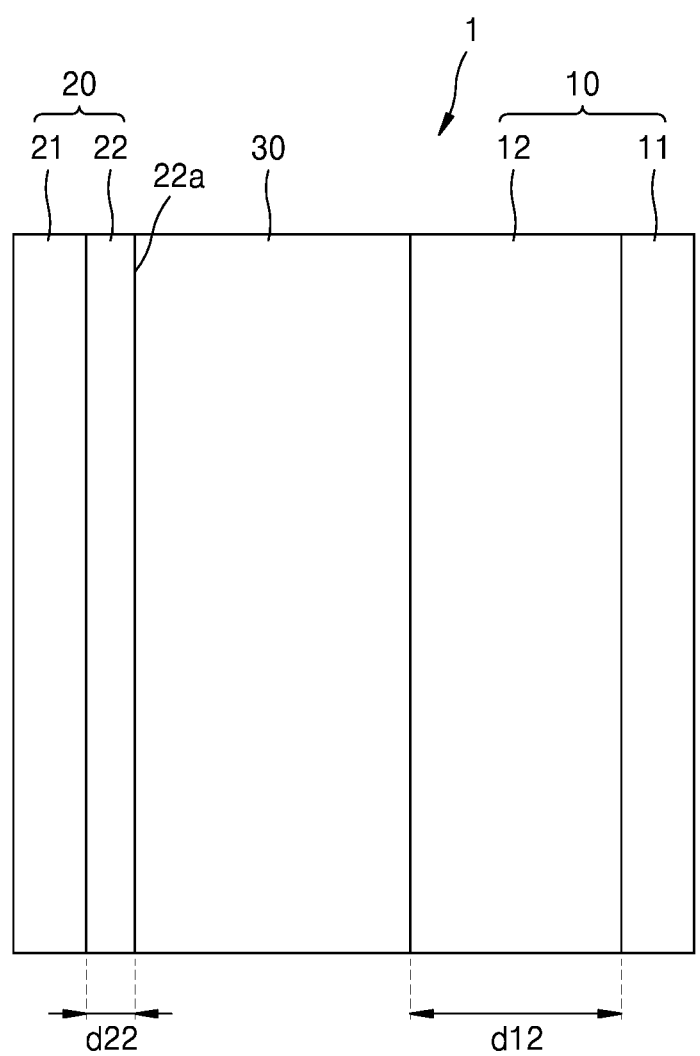
FIG. 1 is a cross-sectional view of an embodiment of an all-solid secondary battery.

The present disclosure will now be described more fully with reference to the accompanying drawings, in which example embodiments are shown. The present disclosure may, however, be embodied in many different forms, should not be construed as being limited to the embodiments set forth herein, and should be construed as including all modifications, equivalents, and alternatives within the scope of the present disclosure; rather, these embodiments are provided so that this disclosure will be thorough and complete, and will fully convey the effects and features of the present disclosure and ways to implement the disclosure to those skilled in the art.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the present disclosure is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation. In the following description and drawings, constituent elements having substantially the same functional constitutions are assigned like reference numerals, and overlapping descriptions will be omitted.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, a C rate means a current which will discharge a battery in one hour, e.g., a C rate for a battery having a discharge capacity of 1.6 ampere-hours would be 1.6 amperes.

As used herein, the term "ionic compound" refers to a chemical compound including ions agglomerated by an electrostatic force called an ionic bond. The ionic compound may consist of cations and anions.

As used herein, the term "binary compound" refers to a compound consisting of two different elements. The binary compound may be, for example, a compound represented by AB or $A_2B$, wherein A may be a cation, and B may be an anion.

As used herein, the term "ternary compound" refers to a compound consisting of three different elements. The ternary compound may be, for example, a compound represented by $A_2BX_4$ or $ABX_4$, wherein A may be a cation, B may be a cation or an anion, and X may be an anion.

As used herein, the term "inorganic compound" refers to a compound which does not include a carbon-hydrogen (C—H) bond or a carbon-halogen (C—X, wherein X is F, Cl, Br, or I) bond, i.e., a non-organic compound.

As used herein, the term "crystalline compound" refers to a compound having a highly ordered microscopic structure of constituent elements. The highly ordered microscopic structure may form a crystal lattice extending in all directions. The crystalline compound may exhibit a peak corresponding to a structure of the crystal lattice in X-ray diffraction ("XRD") spectra thereof. The crystalline compound is a solid.

As used herein, the term "amorphous compound" refers to a compound in which constituent atoms are irregularly arranged without an aligned microstructure. The amorphous compound does not form a crystal lattice. For example, in an XRD spectrum of the amorphous compound, a peak corresponding to a crystal lattice structure may not appear.

As used herein, the term "average particle diameter" of particles may means an average particle diameter when the particles are spherical or may means, when the particles are non-spherical, an average diameter of spheres having the same volume as the non-spherical particles. The average diameter may be a median diameter (D50), which is defined as a particle diameter corresponding to 50% in a cumulative distribution curve, i.e., which a particle diameter of 50% of particles is less than. The "50%" is on the basis of volume. The average particle diameter of particles may be measured using a particle size analyzer (PSA).

As used herein, the term "ionic radii" of anions may be measured using X-ray diffraction ("XRD").

An all-solid battery uses a solid electrolyte instead of a liquid electrolyte. An all-solid battery may not use a flammable organic solvent, and may have a reduced risk of fire or explosion should a short circuit occur. Accordingly, the all-solid battery may have increased safety as compared with a lithium ion battery using a liquid electrolyte.

An all-solid battery may not exhibit good cycle characteristics due to side reactions resulting from oxidation and reduction of a solid electrolyte between an anode layer and a solid electrolyte layer during charge and discharge processes.

An all-solid battery may use a solid electrolyte which may be electrochemically stable during charge and discharge processes. A solid electrolyte may have high mechanical intensity, high chemical stability, or a combination thereof, but a high temperature, high pressure, or a combination thereof may be used for sintering powder of the solid electrolyte. For example, a high temperature of 1,000° C. or greater may be used for sintering oxide-based solid electrolyte powder.

Hereinafter, embodiments of an all-solid secondary battery and a method of manufacturing an all-solid secondary battery will be described in greater detail.

According to an aspect of the disclosure, an all-solid secondary battery includes: an anode, e.g., an anode layer, including an anode current collector and a first anode active material layer; a cathode, e.g., a cathode layer, including a cathode active material layer; and a solid electrolyte layer between the anode layer and the cathode layer, wherein the first anode active material layer includes an anode active material and an ionic compound, the ionic compound includes a binary compound, a ternary compound, or a combination thereof, and the ionic compound does not include a plurality of sulfur (S) atoms.

Since the first anode active material layer includes the ionic compound, a side reaction of a solid electrolyte between the first anode active material layer and the solid electrolyte layer may be suppressed, and consequently the all-solid secondary battery may have improved cycle characteristics. By the inclusion of the ionic compound in the first anode active material layer, the first anode active material layer may have improved electrochemical stability, and thus the solid electrolyte layer in contact with the first anode active material layer may have improved stability. For example, by the inclusion of the ionic compound in the first anode active material layer, the first anode active material layer may serve as a kind of an artificial solid electrolyte interface film. For example, due to the inclusion of the ionic compound in the first anode active material layer, a solid electrolyte interface ("SEI") film formed between the first anode active material layer and the solid electrolyte layer during charge and discharge may have a more stable structure, as compared with a SEI film generated in a comparative all-solid secondary battery.

Figure 2:
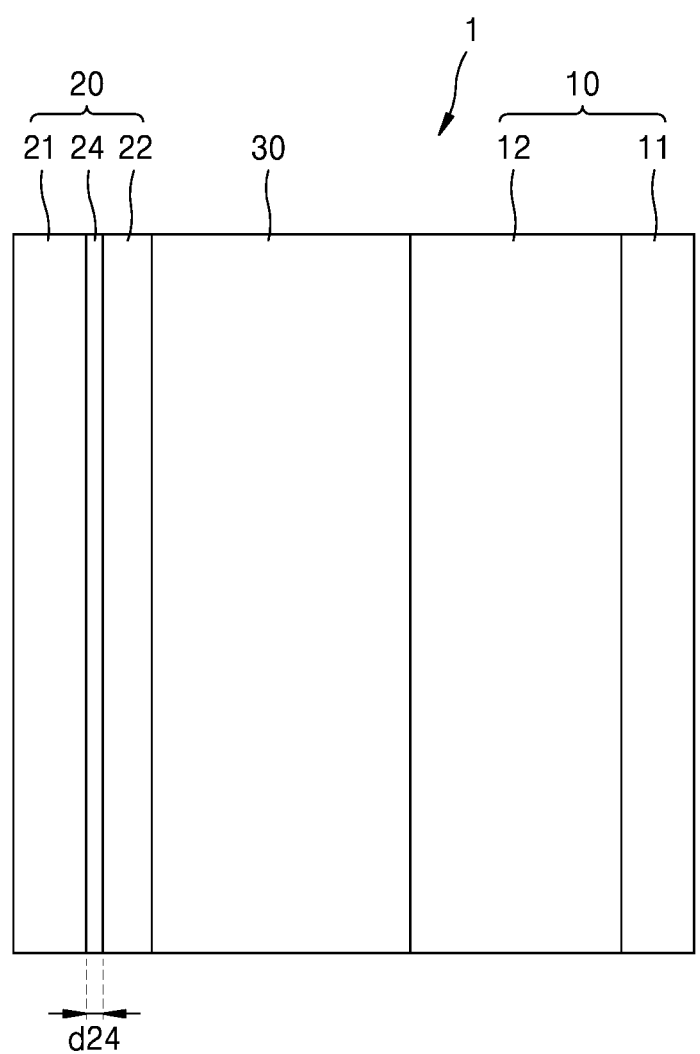
FIG. 2 is a cross-sectional view of an embodiment of an all-solid secondary battery.
Figure 3:
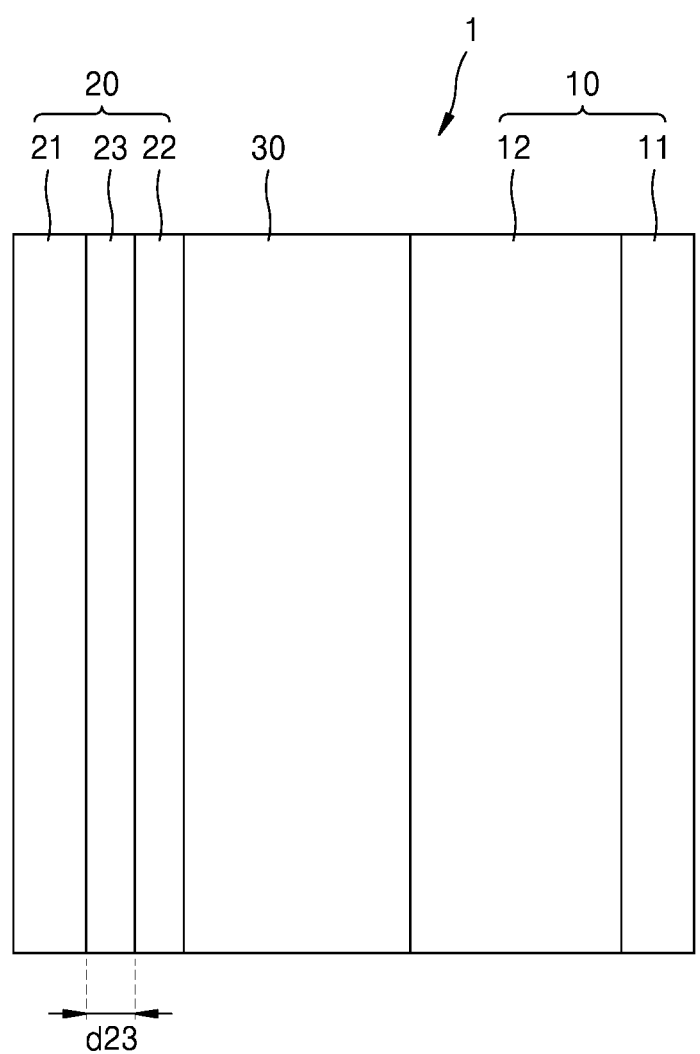
FIG. 3 is a cross-sectional view of an embodiment of an all-solid secondary battery.

Referring to FIGS. 1 to 3, an all-solid secondary battery 1 according to an embodiments may include: an anode layer 20 including an anode current collector layer 21 and a first anode active material layer 22; a cathode layer 10 including a cathode active material layer 12; and a solid electrolyte layer 30 arranged between the anode layer 20 and the cathode layer 10.

Anode Layer

Referring to FIGS. 1 to 3, the anode layer 20 may include the anode current collector layer 21 and the first anode active material layer 22. The first anode active material layer 22 may include an anode active material and an ionic compound. The ionic compound may include a binary compound, a ternary compound, or a combination thereof. The ionic compound may not include a plurality of sulfur (S) atoms, i.e., two or more sulfur (S) atoms. Ternary compounds and/or binary compounds including two or more sulfur atoms, for example, $P_2S_5$, $Li_3PS_4$, $Li_2P_2S_6$, $Li_7P_3S_{11}$, $Li_7PS_6$, $Li_4S_2P_6$, or the like may be excluded from use as the ionic compound.

The ionic compound of the first anode active material layer 22 may be, for example, an inorganic compound. Accordingly, the ionic compound is distinguished from an organic binder such as an ionic polymer. The ionic compound may be an electrochemically inert compound. Accordingly, the ionic compound is distinguished from an anode active material having electrochemical activity such as $Li_4Ti_5O_{12}$.

The ionic compound included in the first anode active material layer 22 may be, for example, a crystalline compound. For example, the binary compound may have a crystal structure such as a rocksalt-type structure, a wurtzite-type structure, an antifluorite structure, or a hexagonal structure. The ternary compound may have a crystal structure such as an antiperovskite-type structure, a layered-type structure, a spinel-type structure, or a trigonal structure. LiCl may have a crystal structure, for example, a rocksalt-type structure or a wurtzite-type structure. In an embodiment, the ionic compound may be an amorphous compound. For example, LiCl may form an amorphous phase.

The ionic compound included in the first anode active material layer 22 may be, for example, a metal salt compound including a metal cation. A metal element of the metal salt compound may include, for example, an alkali metal element such as Li, Na, or K. For example, the ionic compound may be a lithium salt compound including a lithium element. The lithium salt compound is an ionic compound including a lithium cation. Accordingly, binary compounds or ternary compounds not including a lithium element, for example, $Al_2O_3$, $SiO_2$, $TiO_2$, $BaTiO_3$, or the like are excluded from use as the ionic compound.

Anions of the lithium salt compound included in the first anode active material layer 22 may have an ionic radius of, for example, about 0.40 nanometers (nm) or less, about 0.35 nm or less, about 0.30 nm or less, about 0.25 nm or less, or about 0.20 nm or less. Anions of the lithium salt compound included in the first anode active material layer 22 may have an ionic radius of, for example, about 0.001 nm or greater, about 0.01 nm or greater, or about 0.1 nm or greater. When the anions of the lithium salt compound have an ionic radius within these ranges, side reactions with the solid electrolyte may be suppressed, or a solid electrolyte interface film resulting from reaction with the solid electrolyte may have improved stability. For example, F anions may have an ionic radius of about 0.136 nm, Cl anions may have an ionic radius of about 0.181 nm, Br anions may have an ionic radius of about 0.196 nm, and I anions may have an ionic radius of about 0.216 nm. In contrast, bis(trifluoromethanesulfonyl)imide ("TFSI") anions may have an ionic radius of about 0.439 nm. The ionic radius may be an atomic radius or thermochemical radius in an ionic crystal structure.

For example, the lithium salt compound of the first anode active material layer 22 may include at least one binary compound such as LiF, LiCl, LiBr, LiI, LiH, $Li_2S$, $Li_2O$, $Li_2Se$, $Li_2Te$, $Li_3N$, $Li_3P$, $Li_3As$, $Li_3Sb$, or $Li_3B$; at least one ternary compound such as $Li_3OCl$, $LiPF_6$, $LiBF_4$, $LiSbF_6$, $LiAsF_6$, $LiClO_4$, $LiAlO_2$, $LiAlCl_4$, $LiNO_3$, $Li_2CO_3$, $LiBH_4$, $Li_2SO_4$, $Li_3BO_3$, $Li_3PO_4$, $Li_4NCl$, $Li_5NCl_2$, or $Li_3BN_2$; or a combination thereof. For example, the lithium salt compound may be a lithium halide compound such as LiF, LiCl, LiBr, LiI, or a combination thereof.

The lithium salt compound in the first anode active material layer 22 may be present independently, not as a composite with sulfide or other compounds. This lithium salt compound is distinguished from a lithium salt compound used as a precursor in preparation of a solid electrolyte such as a sulfide-based solid electrolyte and constituting part of the solid electrolyte. For example, LiCl of a $Li_2S$—$SiS_2$—LiCl composite is distinguished from the lithium salt compound of the first anode active material layer 22.

An amount of the ionic compound in the first anode active material layer 22 may be, for example, about 3 weight percent (wt %) to about 80 wt %, about 3 wt % to about 50 wt %, about 3 wt % to about 30 wt %, about 3 wt % to about 25 wt %, about 3 wt % to about 20 wt %, about 5 wt % to about 20 wt %, about 7 wt % to about 15 wt %, or about 7 wt % to about 13 wt %, based on a total weight of the first anode active material layer 22. When the amount of the ionic compound in the first anode active material layer 22 is within these ranges, the all-solid secondary battery 1 may have further improved cycle characteristics. When the amount of the ionic compound is excessively small, a cycle characteristics improvement effect may be negligible. When the amount of the ionic compound is excessive, the amount of the anode active material may become relatively small, so that the first anode active material layer may not function properly. Furthermore, due to increased growth of lithium dendrite, the all-solid electrolyte battery 1 may have poor cycle characteristics. When the amount of the ionic compound is 50 wt % or greater, the ionic compound may be partially precipitated from the slurry including the ionic compound, so that processability in preparing and coating the slurry including the ionic compound may be partially deteriorated. For example, film characteristic of the first anode active material layer 22 may become partially non-uniform. Accordingly, the amount of the ionic compound included in the first anode active material layer 22 may be, for example, about 3 wt % to less than about 50 wt %, about 3 wt % to about 30 wt %, or about 7 wt % to about 13 wt %.

The anode active material of the first anode active material layer 22 may be, for example, in the form of particles. For example, the anode active material in the form of particles may have an average particle diameter of 4 micrometers (μm) or less, about 3 μm or less, about 2 μm or less, about 1 μm or less, or about 900 nm or less. For example, the anode active material in the form of particles may have an average particle diameter of about 10 nm to about 4 μm, about 10 nm to about 3 μm, about 10 nm to about 2 μm, about 10 nm to about 1 μm, or about 10 nm to about 900 nm. When the anode active material has an average particle diameter within these ranges, reversible absorption, desorption, or a combination thereof of lithium during charge and discharge may be further facilitated. The average particle diameter of the anode active material may be a median diameter (D50) obtained using, for example, a laser-diffraction particle size distribution analyzer.

For example, the anode active material of the first anode active material layer 22 may further include a carbonaceous anode active material; a metal, metalloid anode active material, or a combination thereof; or a combination thereof.

The carbonaceous anode active material may be, for example, amorphous carbon. For example, the amorphous carbon may be carbon black ("CB"), acetylene black ("AB"), furnace black ("FB"), ketjen black ("KB"), or graphene. However, embodiments are not limited thereto. Any suitable amorphous carbons may be used. The amorphous carbon refers to carbon without crystallinity or with very low crystallinity, and is distinguished from crystalline carbon or graphitic carbon.

The metal, metalloid anode active material, or a combination thereof may include gold (Au), platinum (Pt), palladium (Pd), silicon (Si), silver (Ag), aluminum (Al), bismuth (Bi), tin (Sn), antimony (Sb), magnesium (Mg), zinc (Zn), or a combination thereof. However, embodiments are not limited thereto. Any suitable metal anode active material, metalloid anode active material, or combination thereof capable of forming an alloy or compound with lithium may be used. For example, nickel (Ni), which does not form an alloy with lithium, may not be used as the metal anode active material.

The first anode active material layer 22 may include one of the above-listed anode active materials or a mixture of at least two of the above-listed anode active materials. For example, the first anode active material layer 22 may include only amorphous carbon alone, or gold (Au), platinum (Pt), palladium (Pd), silicon (Si), silver (Ag), aluminum (Al), bismuth (Bi), tin (Sn), antimony (Sb), magnesium (Mg), zinc (Zn), or a combination thereof. In an embodiment, the first anode active material layer 22 may include a mixture of amorphous carbon and gold (Au), platinum (Pt), palladium (Pd), silicon (Si), silver (Ag), aluminum (Al), bismuth (Bi), tin (Sn), antimony (Sb), magnesium (Mg), zinc (Zn), or a combination thereof. In the mixture of the amorphous carbon and a metal, metalloid, or a combination thereof, a mixed ratio of the amorphous carbon to the metal, metalloid, or a combination thereof may be, for example, about 10:1 to about 1:2, about 5:1 to about 1:1, or about 4:1 to about 2:1 in weight ratio. However, embodiments are not limited thereto. The mixed ratio may be appropriately chosen according to desired characteristics of the all-solid secondary battery 1. Since first anode active material layer 22 has a composition as described above, the all-solid secondary battery 1 may have further improved cycle characteristics.

The anode active material of the first anode active material layer 22 may include a mixture of first particles including, e.g., consisting of, amorphous carbon and second particles including, e.g., consisting of, a metal, metalloid, or combination thereof. Examples of the metal, metalloid, or combination thereof may be gold (Au), platinum (Pt), palladium (Pd), silicon (Si), silver (Ag), aluminum (Al), bismuth (Bi), tin (Sn), antimony (Sb), magnesium (Mg), and zinc (Zn). For example, the metalloid may be a semiconductor. The amount of the second particles may be about 8 wt % to about 60 wt %, about 10 wt % to about 50 wt %, about 15 wt % to about 40 wt %, or about 20 wt % to about 30 wt %, based on a total weight of the mixture. When the amount of the second particles is within these ranges, the all-solid secondary battery 1 may have further improved cycle characteristics.

The first anode active material layer 22 may include, for example, a binder. The binder may be, for example, a styrene-butadiene rubber ("SBR"), polytetrafluoroethylene ("PTFE"), polyvinylidene fluoride ("PVDF"), polyethylene, a vinylidene fluoride/hexafluoropropylene copolymer, polyacrylonitrile, or polymethylmethacrylate. However, embodiments are not limited thereto. Any suitable binder may be used. The binder may be one binder or include a plurality of different binders. The first anode active material layer 22 may include a surface 22a contacting the solid electrolyte layer 30.

By the inclusion of the binder, the first anode active material layer 22 may be stabilized on the anode current collector 21. In addition, cracking of the first anode active material layer 22 may be suppressed in spite of volume change, relative position change, or a combination thereof of the first anode active material layer 22 during charge and discharge processes. For example, when the first anode active material layer 22 does not include such a binder, the first anode active material layer 22 may be easily separated from the anode current collector 21. When a portion of the first anode active material layer 22 is separated from the anode current collector 21, the anode current collector 21 may be partially exposed to contact with the solid electrolyte layer 30, and accordingly, a short-circuit may more likely occur. For example, the first anode active material layer 22 may be formed by coating, on the anode current collector 21, a slurry in which ingredients of the first anode active material layer 22 are dispersed, and then drying the resulting product. By inclusion of the binder in the first anode active material layer 22, the anode active material may be stably dispersed in the slurry. For example, when the slurry is coated on the anode current collector 21 by using screen printing, clogging of the screen (for example, clogging by aggregates of the anode active material) may be suppressed.

For example, a thickness d22 of the first anode active material layer 22 may be about 50% or less, about 40% or less, about 30% or less, about 20% or less, about 10% or less, or about 5% or less of a thickness of the cathode active material layer. For example, the thickness d22 of the first anode active material layer 22 may be about 1 µm to about 20 µm, about 2 µm to about 10 µm, or about 3 µm to about 7 µm. When the thickness d22 of the first anode active material layer 22 is too thin, the first anode active material layer 22 may be disintegrated by lithium dendrites generated between the first anode active material layer 22 and the anode current collector 21, which may deteriorate cycle characteristics of the all-solid secondary battery 1. When the thickness d22 of the first anode active material layer 22 is too thick, the all-solid secondary battery 1 may have a reduced energy density, an increased internal resistance, and thus poor cycle characteristics.

When the thickness d22 of the first anode active material layer 22 is reduced, for example, the first anode active material layer 22 may have a reduced charge capacity. For example, a charge capacity of the first anode active material layer 22 may be about 50% or less, about 40% or less, about 30% or less, about 20% or less, about 10% or less, about 5% or less, or about 2% or less of a charge capacity of the cathode active material layer 12, which has a thickness d12. For example, a charge capacity of the first anode active material layer 22 may be about 0.1% to about 50%, about 0.1% to about 40%, about 0.1% to about 30%, about 0.1% to about 20%, about 0.1% to about 10%, about 0.1% to about 5%, or about 0.1% to about 2% of a charge capacity of the cathode active material layer 12. When the charge capacity of the first anode active material layer 22 is too small, the thickness of the first anode active material layer 22 may become so thin that the first anode active material layer 22 may be disintegrated by lithium dendrites generated between the first anode active material layer 22 and the anode current collector during repeated charging and discharging processes, and consequently the all-solid secondary battery 1 may have poor cycle characteristics. When the charge capacity of the first anode active material layer 22 is excessively increased, the all-solid secondary battery 1 may have a reduced energy density, an increased internal resistance, and thus poor cycle characteristics.

The charge capacity of the cathode active material layer 12 may be obtained by multiplying a charge capacity density (millampere hours per gram (mAh/g)) of a cathode active material in the cathode active material layer 12 by a mass of the cathode active material. When different cathode active materials are used, a charge capacity density of each of the cathode active materials may be multiplied by a mass thereof, and then the sum of the multiplication products may be calculated as the charge capacity of the cathode active material layer 12. The charge capacity of the first anode active material layer 22 may be calculated in the same manner. That is, the charge capacity of the first anode active material layer 22 may be obtained by multiplying a charge capacity density of an anode active material in the first anode active material layer 22 by a mass of the anode active material. When a plurality of different anode active materials are used, a charge capacity density of each of the anode active materials may be multiplied by a mass thereof, and then the sum of the multiplication products may be calculated as the charge capacity of the first anode active material layer 22. The charge capacity densities of the cathode active material and the anode active material are estimated capacities obtained with an all-solid half-cell including lithium metal as a counter electrode. The charge capacities of the cathode active material layer 12 and the first anode active material layer 22 may be directly calculated using an all-solid half-cell. The measured charge capacity of each of the cathode and anode active materials may be divided by a mass of the corresponding active material to thereby obtain the charge capacity density of the active material. In an embodiment, the charge capacities of the cathode active material layer 12 and the first anode active material layer 22 may be initial charge capacities measured after $1^{st}$ cycle charging.

For example, the anode current collector 21 may consist of a material which does not react with lithium to form an alloy or compound. The material of the anode current collector 21 may be, for example, copper (Cu), stainless steel (SUS), titanium (Ti), iron (Fe), cobalt (Co), nickel (Ni), or the like. However, embodiments are not limited thereto. Any suitable material as an anode current collector may be used. The anode current collector 21 may include one of the above-listed metals or an alloy or a coated material of two or more of the above-listed metals. The anode current collector 12 may be, for example, in the form of a plate or a foil.

The first anode active material layer 22 of the all-solid secondary battery 1 may further include an additive(s), for example, a filler, a dispersing agent, an ionic conducting agent, or the like.

Referring to FIG. 2, in an embodiment, the all-solid secondary battery 1 may further include a thin film 24 on the anode current collector 21, the thin film 24 including an element alloyable with lithium. The thin film 24 may be arranged between the anode current collector 21 and the first anode active material layer 22. The thin film 24 may include, for example, an element alloyable with lithium. The element alloyable with lithium may be, for example, gold (Au), silver (Ag), zinc (Zn), tin (Sn), indium (In), silicon (Si), aluminum (Al), bismuth (Bi), magnesium (Mg), antimony (Sb), or the like. However, embodiments are not limited thereto. Any suitable element which may form an alloy with lithium may be used. The thin film 24 may consist of one of the above-listed metals or metalloid or an alloy of two or more of the metals or metalloid. Due to the arrangement of the thin film 24 on the anode current collector 21, for example, a second anode active layer (not shown) disposed between the thin film 24 and the first anode active material layer 22 may be further planarized, further improving cycle characteristics of the all-solid secondary battery 1.

A thickness d24 of the thin film 24 may be, for example, about 1 nm to about 800 nm, about 10 nm to about 700 nm, about 50 nm to about 600 nm, or about 100 nm to about 500 nm. When the thickness d24 of the thin film 24 is less than 1 nm, the thin film 24 may not function properly. When the thickness d24 of the thin film 24 is too thick, the thin film 24 may absorb lithium, so that a precipitation of lithium on the anode may be reduced, which may consequently lower energy density of the all-solid secondary battery 1 and deteriorate cycle characteristics thereof. The thin film 24 may be formed on the anode current collector by using, for example, a vapor deposition method, a sputtering method, a plating method, or the like. However, embodiments are not limited thereto. Any suitable method capable of forming the thin film 24 may be used.

Referring to FIG. 3, in an embodiment, the all-solid secondary battery 1 may further include a second anode active material layer 23 between the anode current collector 21 and the solid electrolyte layer 30. For example, the all-solid secondary battery 1 may further include the second anode active material layer disposed between the anode current collector 21 and the first anode active material layer 22 through charging. In an embodiment, although not illustrated, the all-solid secondary battery 1 may further include a second anode active material layer disposed between the solid electrolyte layer 30 and the first anode active material layer 22 through charging. In an embodiment, although not illustrated, the all-solid secondary battery 1 may further include a second anode active material layer deposited within the first anode active material layer 22 through charging.

The second anode active material layer 23 may be a metal layer including lithium, a lithium alloy, or a combination thereof. The metal layer may include lithium, a lithium alloy, or a combination thereof. Since the second anode active material layer 23 is a metal layer including lithium, the second anode active material layer 23 may function, for example, as a lithium reservoir. The lithium alloy may be, for example, a Li—Al alloy, a Li—Sn alloy, a Li—In alloy, a Li—Ag alloy, a Li—Au alloy, a Li—Zn alloy, a Li—Ge alloy, a Li—Si alloy, a Li—Mg alloy, or a Li—Sb alloy. However, embodiments are not limited thereto. Any suitable lithium alloy may be used. The second anode active material layer 23 may include a lithium alloy, lithium, or a combination thereof, or a plurality of different alloys.

A thickness d23 of the second anode active material layer 23 is not specifically limited. For example, the thickness d23 of the second anode active material layer 23 may be about 1 μm to about 1,000 μm, about 1 μm to about 500 μm, about 1 μm to about 200 μm, about 1 μm to about 150 μm, about 1 μm to about 100 μm, or about 1 μm to about 50 μm. When the thickness d23 of the second anode active material layer 23 is too thin, the second anode active material layer 23 may not appropriately function as a lithium reservoir. When the thickness d23 of the second anode active material layer 23 is too thick, the mass and volume of the all-solid secondary battery 1 may be increased, further deteriorating cycle characteristics. The second anode active material layer 23 may be, for example, a metal foil having a thickness within these ranges.

The second anode active material layer 23 of the all-solid secondary battery 1 may, for example, be arranged between the anode current collector 21 and the first anode active material layer 22 before assembly of the all-solid secondary battery 1, or be precipitated between the anode current collector 21 and the first anode active material layer 22 by charging after assembly of the all-solid secondary battery 1.

When the second anode active material layer 23 is arranged between the anode current collector 21 and the first anode active material layer 22 before assembly of the all-solid secondary battery, the second anode active material layer 23 as a metal layer including lithium may function as a lithium reservoir. The all-solid secondary battery 1 including the second anode active material layer 23 may have further improved cycle characteristics. For example, a lithium foil as the second anode active material layer 23 may be arranged between the anode current collector 21 and the first anode active material layer 22 before assembly of the all-solid secondary battery 1.

When the second active material layer 23 is deposited by charging after assembly of the all-solid secondary battery 1, the all-solid secondary battery 1 may have an increased energy density since the second anode active material layer 23 is not included in assembling the all-solid secondary battery 1. For example, the all-solid secondary battery 1 may be charged until a charge capacity of the first anode active material layer 22 is exceeded. That is, the first anode active material layer 22 may be overcharged. At an initial charging stage, lithium may be absorbed into the first anode active material layer 22. That is, the anode active material in the first anode active material layer 22 may form an alloy or compound with lithium ions moved from the cathode layer 10. When the all-solid secondary batter 1 is charged over the capacity of the first anode active material layer 22, for example, lithium may be precipitated on a rear surface of the first anode active material layer 22, i.e., between the anode current collector 21 and the first anode active material layer 22, thus forming a metal layer corresponding to the second anode active material layer 23. The second anode active material layer 23 may be a metal layer including lithium (i.e., metal lithium) as a major component. This may be attributed to, for example, the fact that the anode active material in the first anode active material layer 22 includes a material capable of forming an alloy or compound with lithium. During discharge, lithium in the first anode active material layer 22 and the second anode active material layer 23, i.e., lithium metal layer, may be ionized and then move towards the cathode layer 10. Accordingly, the all-solid secondary battery 1 may use lithium as the anode active material. Since the first anode active material layer 22 coats the second anode active material layer 23, the first anode active material layer 22 may function as a protective layer of the second anode active material layer 23 and at the same time suppress precipitation and growth of lithium dendrite. Accordingly, a short-circuit and reduction in capacity of the all-solid secondary battery 1 may be suppressed, and consequently cycle characteristics of the all-solid secondary battery 1 may be improved. When the second anode active material layer 23 is disposed through charging after assembly of the all-solid secondary battery 1, the anode current collector 21, the first anode active material layer 22, and a region therebetween may be, for example, Li-free regions which do not include lithium (Li) metal or a Li alloy in an initial state or a post-discharge state of the all-solid secondary battery.

Solid Electrolyte Layer

Referring to FIGS. 1 to 3, the solid electrolyte layer 30 may contain a solid electrolyte between the cathode layer 10 and the anode layer 20.

The solid electrolyte may be, for example, a sulfide-based solid electrolyte. The sulfide-based solid electrolyte may be, for example, $Li_2S-P_2S_5$, $Li_2S-P_2S_5-LiX$ (wherein X is a halogen), $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (wherein m and n are each independently a positive number, and Z is Ge, Zn, or Ga), $Li_2S-GeS_2$, $Li_2S-SiS_2-Li_3PO_4$, $Li_2S-SiS_2-Li_pMO_q$ (wherein p and q are each independently a positive number, and M is P, Si, Ge, B, Al, Ga, or In), or a combination thereof. The sulfide-based solid electrolyte may be prepared using a starting or source material, for example, $Li_2S$, $P_2S_5$, or the like by melt quenching or mechanical milling, after which thermal treatment may further be performed. The solid electrolyte may be amorphous, crystalline, or a mixed state thereof.

The solid electrolyte may be, for example, any of the above-listed sulfide-based solid electrolyte materials including at least sulfur (S), phosphorous (P), and lithium (Li) as constituent elements. For example, the solid electrolyte may be a material including $Li_2S-P_2S_5$. When the solid electrolyte includes $Li_2S-P_2S_5$ as a sulfide-based solid electrolyte material, a mixed mole ratio of $Li_2S$ to $P_2S_5$ ($Li_2S:P_2S_5$) may be, for example, in a range of about 50:50 to about 90:10.

For example, the sulfide-based solid electrolyte may include $Li_7P_3S_{11}$, $Li_7PS_6$, $Li_4P_2S_6$, $Li_3PS_6$, $Li_3PS_4$, $Li_2P_2S_6$, or a combination thereof.

The sulfide-based solid electrolyte may include, for example, an argyrodite-type solid electrolyte represented by Formula 1:

$$Li^+{}_{12-n-x}A^{+}X^{2-}{}_{6-x}Y'^{1-}{}_x \qquad \text{Formula 1}$$

In Formula 1, 0≤x≤2; A may be P, As, Ge, Ga, Sb, Si, Sn, Al, In, Ti, V, Nb, or Ta; X may be S, Se, or Te; Y' may be Cl, Br, I, F, CN, OCN, SCN, or $N_3$; and n is a valence of A. In an embodiment, n may be 3, 4, or 5.

For example, the argyrodite-type solid electrolyte may include $Li_{7-x}PS_{6-x}Cl_x$ (wherein 0≤x≤2), $Li_{7-x}PS_{6-x}Br_x$ (wherein 0≤x≤2), $Li_{7-x}PS_{6-x}I_x$ (wherein 0≤x≤2), or a combination thereof. For example, the argyrodite-type solid electrolyte may include $Li_6PS_5Cl$, $Li_6PS_5Br$, $Li_6PS_5I$, or a combination thereof.

For example, the solid electrolyte may have an elastic modulus, i.e., Young's modulus, of about 35 gigapascals (GPa) or less, about 30 GPa or less, about 27 GPa or less, about 25 GPa or less, or about 23 GPa or less. For example, the solid electrolyte may have an elastic modulus, i.e., Young's modulus, of about 10 GPa to about 35 GPa, about 15 GPa to about 30 GPa, or about 15 GPa to about 25 GPa. When the solid electrolyte has an elastic modulus within these ranges, sintering of the solid electrolyte may be facilitated.

For example, the solid electrolyte layer 30 may further include a binder. The binder included in the solid electrolyte layer 30 may be, for example, a styrene-butadiene rubber ("SBR"), polytetrafluoroethylene ("PTFE)", polyvinylidene fluoride ("PVDF"), polyethylene, or polyacrylate resin. However, embodiments are not limited thereto. Any suitable binder may be used. The binder of the solid electrolyte layer 30 may be the same as or different from the binders of the cathode active material layer 12 and the first anode active material layer 22.

Cathode Layer

The cathode layer 10 may include a cathode current collector 11 and the cathode active material layer 12.

The cathode current collector 11 may be a plate or foil including indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode active material layer 12 may include, for example, a cathode active material and a solid electrolyte. The solid electrolyte in the cathode layer 10 may be the same as or different from the solid electrolyte of the solid electrolyte layer 30. Details of the solid electrolyte may be the same as described above in connection with the solid electrolyte layer 30.

The cathode active material may be a cathode active material capable of absorption and desorption of lithium ions. The cathode active material may be, for example, a lithium transition metal oxide, such as lithium cobalt oxide ("LCO"), lithium nickel oxide, lithium nickel cobalt oxide, lithium nickel cobalt aluminum oxide ("NCA"), lithium nickel cobalt manganese oxide ("NCM"), lithium manganate, or lithium iron phosphate; nickel sulfide; copper sulfide; lithium sulfide; iron oxide; or vanadium oxide. However, embodiments are not limited thereto. Any suitable cathode active material may be used. One or more cathode active materials may be used.

The cathode active material may be, for example, a compound represented by one of the following formula: $Li_aA_{1-b}B'_bD_2$ (wherein $0.90 \leq a \leq 1$, and $0 \leq b \leq 0.5$); $Li_aE_{1-b}B'_bO_{2-c}D_c$ (wherein $0.90 \leq a \leq 1$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_2-\alpha F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, and $0.001 \leq b \leq 0.1$); $Li_aCoG_bO_2$ (wherein $0.90 \leq a \leq 1$, and $0.001 \leq b \leq 0.1$); $Li_aMnG_bO_2$ (wherein $0.90 \leq a \leq 1$, and $0.001 \leq b \leq 0.1$); $Li_aMn_2G_bO_4$ (wherein $0.90 \leq a \leq 1$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds listed above as cathode active materials may have a surface coating layer (hereinafter, also referred to as "coating layer"). A mixture of a compound listed above without a coating layer and a compound listed above having a coating layer may be used. In an embodiment, the coating layer on the surface of such compounds may include a compound of a coating element such as an oxide, a hydroxide, an oxyhydroxide, an oxycarbonate, or a hydroxycarbonate of the coating element, or a combination thereof. In an embodiment, the compounds for the coating layer may be amorphous or crystalline. In an embodiment, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In an embodiment, the coating layer may be formed using any suitable method that does not adversely affect the physical properties of the cathode active material. For example, the coating layer may be formed using a spray coating method, a dipping method, or the like.

The cathode active material may include, for example a lithium salt of a transition metal oxide having a layered rocksalt-type structure among the above-listed lithium transition metal oxides. The term "layered rocksalt-type structure" used herein refers to a structure in which oxygen atomic layers and metal atomic layers are alternately regularly arranged in the direction of <111> planes, with each atomic layer forming a 2-dimensional ("2D") plane. A "cubic rocksalt-type structure" refers to a sodium chloride (NaCl)-type crystal structure, and in particular, a structure in which face-centered cubic ("fcc") lattices formed by respective cations and anions are arranged in a way that ridges of the unit lattices are shifted by ½. The lithium transition metal oxide having such a layered rocksalt-type structure may be, for example, a ternary lithium transition metal oxide such as $LiNi_xCo_yAl_zO_2$ ("NCA") or $LiNi_xCo_yMn_xO_2$ ("NCM") (wherein $0 < x < 1$, $0 < y < 1$, $0 < z < 1$, and $x+y+z=1$). When the cathode active material includes such a ternary lithium transition metal oxide having a layered rocksalt-type structure, the all-solid secondary battery 1 may have further improved energy density and thermal stability.

The cathode active material may be covered with a coating layer as described above. The coating layer may be any suitable coating layer for cathode active materials of all-solid secondary batteries. The coating layer may include, for example, $Li_2O$—$ZrO_2$.

When the cathode active material includes, for example, a ternary lithium transition metal oxide including Ni, such as NCA or NCM, the all-solid secondary battery 1 may have an increased capacity density and elusion of metal ion from the cathode active material may be reduced in a charged state. As a result, the all-solid secondary battery 1 may have improved cycle characteristics.

The cathode active material may be in the form of particles having, for example, a true-spherical particle shape or an oval-spherical particle shape. The particle diameter of the cathode active material is not particularly limited, and may be in a range applicable to a cathode active material of an all-solid secondary battery. An amount of the cathode active material in the cathode layer 10 is not particularly limited, and may be in a range applicable to a cathode active material of an all-solid secondary battery.

The cathode layer 10 may further include, in addition to a cathode active material and a solid electrolyte as described above, an additive(s), for example, a conducting agent, a binder, a filler, a dispersing agent, an auxiliary ionic conducting agent, or the like. The conducting agent may be, for example, graphite, carbon black, acetylene black, Ketjen black, carbon fibers, metal powder, or the like. The binder may be, for example, a styrene-butadiene rubber ("SBR"), polytetrafluoroethylene ("PTFE"), polyvinylidene fluoride ("PVDF"), polyethylene, polyarcrylate resin, or the like. The dispersing agent, the auxiliary ionic conducting, the filler, or the like which may be added to the cathode layer 10 may be any suitable materials for use in a cathode of an all-solid secondary battery.

According to another aspect of the disclosure, a method of manufacturing an all-solid secondary battery includes: providing an anode layer; providing a cathode layer; providing a solid electrolyte layer between the anode layer and the cathode layer to thereby prepare a laminate; and pressing the laminate. The all-solid secondary battery may have improved cycle characteristics.

Hereinafter, embodiments of the method will be described with reference to FIGS. 1 to 3. The all-solid secondary battery 1 according to an embodiment may be manufactured by forming the cathode layer 10, the anode layer 20, and the solid electrolyte layer 30 and then laminating them on one another.

Formation of Anode Layer

For example, an anode active material, an ionic compound, and a binder, as ingredients of the first anode active material layer 22, may be added to a polar solvent or a non-polar solvent to prepare a slurry. The prepared slurry may be coated on the anode current collector 21 and then dried to prepare a first laminate. Subsequently, the dried first laminate may be pressed to thereby form the anode layer 20. The pressing may be performed using any suitable method, and is not limited to a specific method, for example, the pressing may be roll pressing or flat pressing. The pressing may be omitted.

The ionic compound may include a binary compound, a ternary compound, or a combination thereof as described above. The ionic compound may not include a plurality of sulfur (S) atoms. The ionic compound may not include sulfur (S) and phosphorous (P) atoms at the same time.

Formation of Cathode Layer

For example, a cathode active material, a conducting agent, a solid electrolyte, and a binder, as ingredients of the cathode active material layer 12, may be added to a non-polar solvent to prepare a slurry. The prepared slurry may be coated on the cathode current collector 11 and then dried to form a laminate. The obtained laminate may be pressed to thereby form the cathode layer 10. The pressing may be performed using any suitable method, and is not limited to a specific method, for example, the pressing may be roll pressing, flat pressing, or isostatic pressing. The pressing may be omitted. In an embodiment, the cathode layer 10 may be formed by compaction molding a mixture of the ingredients of the cathode active material layer 12 into pellets or extending the mixture into a sheet form, in which case, the cathode current collector 11 may be omitted.

Formation of Solid Electrolyte Layer

The solid electrolyte layer 30 may be formed using a solid electrolyte, for example, a sulfide-based solid electrolyte.

The sulfide-based solid electrolyte may be prepared by treatment of a starting, e.g., source, material with, for example, melt quenching or mechanical milling. However, embodiments are not limited thereto. Any suitable method of preparing a sulfide-based solid electrolyte may be used. For example, in the case of using melt quenching, after predetermined amounts of source materials such as $Li_2S$ and $P_2S_5$ are mixed together and then made into pellets, the pellets may be subjected to reaction at a predetermined reaction temperature under inert gas (for example, Ar) or hydrogen sulfide ($H_2S$) or vacuum conditions and then quenched to thereby prepare a sulfide-based solid electrolyte. The reaction temperature of the mixture of $Li_2S$ and $P_2S_5$ may be, for example, about 200° C. to about 400° C., or about 250° C. to about 300° C. The reaction time may be, for example, about 0.1 hours to about 12 hours, or about 1 hour to about 12 hours. The quenching temperature of the reaction product may be about 10° C. or less or about 0° C. or less, and the quenching rate may be about 1° C./second (sec) to about 10,000° C./sec, or about 1° C./sec to about 1,000° C./sec. For example, in the case of using mechanical milling, the source materials such as $Li_2S$ and $P_2S_5$ may be reacted while stirring using, for example, a ball mill, to thereby prepare a sulfide-based solid electrolyte. The stirring rate and stirring time in the mechanical milling are not specifically limited. The higher the stirring rate, the production rate of the sulfide-based solid electrolyte may become higher. The longer the stirring time, the rate of conversion of the source material into the sulfide-based solid electrolyte may become higher. Then, the mixture of the source materials, obtained by melting quenching or mechanical milling, may be thermally treated at a predetermined temperature and then grinded to thereby prepare a solid electrolyte in the form of particles. When the solid electrolyte has glass transition characteristics, the solid electrolyte may be converted from an amorphous form to a crystalline form by thermal treatment.

The solid electrolyte obtained through such a method as described above may be deposited using a film formation method, for example, an aerosol deposition method, a cold spraying method, or a sputtering method, to thereby prepare the solid electrolyte layer 30. In an embodiment, the solid electrolyte layer 30 may be prepared by pressing solid electrolyte particles alone. In an embodiment, the solid electrolyte layer 30 may be formed by mixing a solid electrolyte, a solvent, and a binder together to obtain a mixture, and coating, drying, and then pressing the mixture.

Manufacture of all-Solid Secondary Battery

The cathode layer 10, the anode layer 20, and the solid electrolyte layer 30, which are formed according to the above-described methods, may be stacked such that the solid electrolyte layer 30 is interposed between the cathode layer 10 and the anode layer 20, and then be pressed to thereby manufacture the all-solid secondary battery 1.

For example, the solid electrolyte layer 30 may be arranged on the cathode layer 10 to thereby prepare a second laminate. Subsequently, the anode layer 20 may be arranged on the second laminate such that the first anode active material layer 22 contacts the solid electrolyte layer 30 to thereby prepare a third laminate. The third laminate may then be pressed to thereby manufacture the all-solid secondary battery 1. The pressing may be performed, for example, at a temperature of about room temperature to about 90° C., or a temperature of about 20° C. to about 90° C. In an embodiment, the pressing may be performed at a high temperature of about 100° C. or greater. The pressing time may be, for example, about 30 minutes or less, about 20 minutes or less, about 15 minutes or less, or about 10 minutes or less. For example, the pressing time may be about 1 milliseconds (ms) to about 30 minutes, about 1 ms to about 20 minutes, about 1 ms to about 15 minutes, or about 1 ms to about 10 minutes. The pressing method may be, for example, isostatic pressing, roll pressing, or flat pressing. However, embodiments are not limited thereto. Any suitable pressing method may be used. A pressure applied in the pressing may be, for example, about 500 megapascals (MPa) or less, about 480 MPa or less, about 450 MPa or less, about 400 MPa or less, about 350 MPa or less, about 300 MPa or less, about 250 MPa or less, about 200 MPa or less, about 150 MPa or less, or about 100 MPa or less. For example, the pressure applied in the pressing may be about 50 MPa to about 500 MPa, about 50 MPa to about 480 MPa, about 50 MPa to about 450 MPa, about 50 MPa to about 400 MPa, about 50 MPa to about 350 MPa, about 50 MPa to about 300 MPa, about 50 MPa to about 250 MPa, about 50 MPa to about 200 MPa, about 50 MPa to about 150 MPa, or about 50 MPa to about 100 MPa. Through the pressing under the above-described conditions, for example, the solid electrolyte particles may be sintered to thereby form a single solid electrolyte layer.

Although the constitutions of the all-solid secondary battery 1 and the methods of manufacturing the all-solid secondary battery 1 are described above as embodiments, the disclosure is not limited thereto, and the constituent members of the all-solid secondary battery and the manufacturing processes may be appropriately varied.

One or more embodiments of the disclosure will now be described in detail with reference to the following examples. However, these examples are only for illustrative purposes and are not intended to limit the scope of the one or more embodiments of the disclosure.

Example 1: LiCl 10 Weight Percent (Wt %), 100 Megapascals (MPa), Lithium-Phosphorous-Sulfur ("LPS")+Argyrodite Formation of Anode Layer A nickel (Ni) foil having a thickness of about 10 micrometers (μm) was prepared as an anode current collector. Furnace black ("FB-C") having a primary particle diameter of about 76 nanometers (nm) and silver (Ag) particles having an average particle diameter of about 60 nm were prepared as anode active materials. Lithium chloride (LiCl) powder was prepared as an ionic compound.

Mixed powder of furnace black ("FB-C") and silver particles in a weight ratio of about 3:1, and lithium chloride powder were used to form an anode layer. Specifically, anhydrous lithium chloride powder was added into a container including N-methyl-2-pyrrolidone ("NMP") and then mixed while stirring with a Thinky mixer at about 1300 revolutions per minute (rpm) for about 5 minutes to prepare a first solution. A poly(vinylidene fluoride-co-hexafluoropropylene) ("PVDF-HFP") copolymer binder (PVDF #9300, available from KUREHA) was added to the first solution and then dissolved to prepare a second solution. The mixed powder of furnace black ("FB-C") and silver particles in a weight ratio of 3:1 was added to the second solution and then mixed with stirring to thereby prepare a slurry. The prepared slurry was coated on a Ni foil with a blade coater and then dried in the air at about 80° C. for about 20 minutes. The resulting laminate was vacuum-dried at about 40° C. for about 10 hours. The dried laminate was roll-pressed to planarize a surface of a first anode active material layer of the laminate. Through the above-described process, an anode layer was formed. The first anode active material layer in the anode layer had a thickness of about 5 μm.

In the first anode active material layer, an amount of the lithium chloride was about 10 wt %, and an amount of the binder was about 6 wt %.

Formation of Cathode Layer $Li_2O$—$ZrO_2$ ("LZO")-coated $LiNi_{0.8}Co_{0.15}Mn_{0.05}O_2$ ("NCM") was prepared as a cathode active material. The LZO-coated cathode active material was prepared according to a method disclosed in KR 10-2016-0064942. Argyrodite-type crystalline $Li_6PS_5Cl$ powder was prepared as a solid electrolyte. A polytetrafluoroethylene ("PTFE") binder (Teflon binder, available from DuPont) was prepared. Carbon nanofibers ("CNF") and furnace black ("FB-C") were prepared as conducting agents. The cathode active material, the solid electrolyte, the CNF (conducting agent), the FB-C (conducting agent), and the binder were mixed together in a weight ratio of about 84.2:11.5:1.9:0.9:1.5 to obtain a mixture. This mixture was formed into a large sheet by molding, to thereby form a cathode sheet. The cathode sheet was arranged on a carbon-coated aluminum foil having a thickness of about 18 μm used as a cathode current collector and then pressed to thereby form a cathode layer. A cathode active material layer in the cathode layer had a thickness of about 150 μm.

Preparation of Solid Electrolyte Powder

A mixture of lithium sulfide-type crystalline $Li_7P_3S_{11}$ powder and argyrodite-type crystalline $Li_6PS_5Cl$ powder in a weight ratio of 50:50 was prepared. The mixture was stirred with addition of xylene to thereby prepare a slurry. The slurry was dried in the air at about 80° C. for about 60 minutes to obtain a dried product. The dried product was further vacuum-dried at about 40° C. for about 10 hours. Through the above-described processes, solid electrolyte powder was prepared.

Manufacture of all-Solid Secondary Battery 250 milligrams (mg) of the solid electrolyte powder was applied onto the anode layer and then planarized to thereby form a solid electrolyte layer. The cathode layer prepared as described above was arranged on the solid electrolyte layer to form a laminate. The laminate was then treated by plate pressing under a pressure of about 100 MPa at about 25° C. for about 10 minutes to thereby manufacture an all-solid secondary battery. Through the pressing, the solid electrolyte layer was sintered, and characteristics of the all-solid secondary battery were improved.

Example 2: LiCl 10 wt %, 500 MPa, LPS+Argyrodite

An all-solid secondary battery was manufactured in the same manner as in Example 1, except that the pressure applied to the laminate in the manufacturing of the all-solid secondary battery was varied to about 500 MPa.

Example 3: LiCl 10 wt %, 500 MPa, Argyrodite Alone

An all-solid secondary battery was manufactured in the same manner as in Example 1, except that argyrodite-type crystalline $Li_6PS_5Cl$ powder was used alone as the solid electrolyte powder for the solid electrolyte layer, and the pressure applied to the laminate in the manufacturing of the all-solid secondary battery was varied to about 500 MPa.

Example 4: LiCl 10 wt %, 500 MPa, LPS Alone

An all-solid secondary battery was manufactured in the same manner as in Example 1, except that lithium sulfide-type crystalline $Li_7P_3S_{11}$ powder was used alone as the solid electrolyte powder for the solid electrolyte layer, and the pressure applied to the laminate in the manufacturing of the all-solid secondary battery was varied to about 500 MPa.

Example 5: LiCl 3 wt %, 500 MPa, LPS Alone

An all-solid secondary battery was manufactured in the same manner as in Example 4, except that the amount of LiCl was changed to 3 wt %.

Example 6: LiCl 6 wt %, 500 MPa, LPS Alone

An all-solid secondary battery was manufactured in the same manner as in Example 4, except that the amount of LiCl was changed to 6 wt %.

Example 7: LiCl 15 wt %, 500 MPa, LPS Alone

An all-solid secondary battery was manufactured in the same manner as in Example 4, except that the amount of LiCl was changed to 15 wt %.

Example 8: LiCl 20 wt %, 500 MPa, LPS Alone

An all-solid secondary battery was manufactured in the same manner as in Example 4, except that the amount of LiCl was changed to 20 wt %.

Example 9: LiCl 30 wt %, 500 MPa, LPS Alone

An all-solid secondary battery was manufactured in the same manner as in Example 4, except that the amount of LiCl was changed to 30 wt %.

Example 10: LiCl 40 wt %, 500 MPa, LPS Alone

An all-solid secondary battery was manufactured in the same manner as in Example 4, except that the amount of LiCl was changed to 40 wt %.

Example 11: LiCl 50 wt %, 500 MPa, LPS Alone

An all-solid secondary battery was manufactured in the same manner as in Example 4, except that the amount of LiCl was changed to 50 wt %.

Example 12: LiCl 80 wt %, 500 MPa, LPS Alone

An all-solid secondary battery was manufactured in the same manner as in Example 4, except that the amount of LiCl was changed to 80 wt %.

Example 13: Use of $S_n$ Thin Film

A Ni foil having a thickness of about 10 μm was prepared as an anode current collector. Then, a tin (Sn)-plated thin film having a thickness of about 500 nm was formed on the Ni foil. Then, an all-solid secondary battery was manufactured in the same manner as in Example 3, except that the Ni foil having the Sn thin film was used as an anode current collector.

Example 14: FB-C Alone

An all-solid secondary battery was manufactured in the same manner as in Example 3, except that furnace black ("FB-C") was used alone as the anode active material, instead of the mixture of furnace black ("FB-C") having a primary particle diameter of about 76 nm and silver (Ag) particles having an average particle diameter of about 60 nm in a weight ratio about 3:1.

Example 15: Si Alone

An all-solid secondary battery was manufactured in the same manner as in Example 3, except that silicon (Si) particles having an average particle diameter of about 100 nm were used alone as the anode active material, instead of the mixture of furnace black ("FB-C") having a primary particle diameter of about 76 nm and silver (Ag) particles having an average particle diameter of about 60 nm in a weight ratio about 3:1.

Comparative Example 1: LiCl 0 wt %, 500 MPa, LPS Alone

An all-solid secondary battery was manufactured in the same manner as in Example 4, except that LiCl was not added in the first anode active material layer, and the pressure applied to the laminate in the manufacturing of the all-solid secondary battery was varied to about 500 MPa.

Comparative Example 2: LiCl 0 wt %, 100 MPa, Argyrodite Alone

An all-solid secondary battery was manufactured in the same manner as in Example 3, except that LiCl was not added in the first anode active material layer and the pressure applied to the laminate in the manufacturing of the all-solid secondary battery was varied to about 100 MPa, Comparative Example 3: No Use of First Anode Active Material Layer An all-solid secondary battery was manufactured in the same manner as in Example 3, except that only the Ni anode current collector was used without the formation of the first anode active material layer.

Comparative Example 4: Ni Alone, LiCl 0 wt %

An all-solid secondary battery was manufactured in the same manner as in Example 3, except that nickel (Ni) particles having an average particle diameter of about 100 nm were used alone, instead of the mixture of furnace black ("FB-C") having a primary particle diameter of about 76 nm and silver (Ag) particles having an average particle diameter of about 60 nm in a weight ratio about 3:1, and LiCl was not added.

Comparative Example 5: Graphite Alone, LiCl 0 wt %

An all-solid secondary battery was manufactured in the same manner as in Example 3, except that scaly graphite particles having an average particle diameter of about 5 μm were used alone as the anode active material, instead of the mixture of furnace black ("FB-C") having a primary particle diameter of about 76 nm and silver (Ag) particles having an average particle diameter of about 60 nm in a weight ratio about 3:1, and LiCl was not added.

Evaluation Example 1: Elastic Modulus Measurement

The mixture of sulfide-type crystalline $Li_7P_3S_{11}$ powder and argyrodite-type crystalline $Li_6PS_5Cl$ powder in a weight ratio of 50:50, which was used in Example 1, was pressed under an isostatic pressure of about 500 MPa at about 25° C. for about 10 minutes to thereby prepare first pellets.

The lithium sulfide-type crystalline $Li_7P_3S_{11}$ powder, which was used in Example 4, was pressed under an isostatic pressure of about 500 MPa at about 25° C. for about 10 minutes to thereby prepare second pellets.

An elastic modulus of each of the pellet samples was measured using a TI 980 IO (available BRUKER). The elastic modulus is also called Young's modulus.

A storage modulus at a contact depth of about 200 nm was taken as an elastic modulus. The measurement results are shown in Table 1.

TABLE 1

| Samples | Elastic modulus (gigapascals (GPa)) |
|---|---|
| $Li_7P_3S_{11}$ + $Li_6PS_5Cl$ (mixture in a weight ratio of 50:50) | 26.5 |
| $Li_7P_3S_{11}$ alone | 22.5 |

Referring to Table 1, as a result of the elastic modulus measurement, the solid electrolytes used in Examples 1 and 4 were found to have a low elastic modulus of about 30 GPa or less.

Accordingly, when the solid electrolyte of Example 1 or Example 4 is used in manufacturing an all-solid secondary battery, a reduced pressure may be applied.

Evaluation Example 2: Charge-Discharge Test

Charge-discharge characteristics of each of the all-solid secondary batteries manufactured in Examples 1 to 12 and Comparative Examples 1 to 5 were evaluated by a charge-discharge test as follows. The charge-discharge test of the all-solid secondary batteries was performed in a 60° C.-thermostatic bath.

At a $1^{st}$ cycle, each all-solid secondary battery was charged with a constant current of 0.1 C for about 12.5 hours until a battery voltage reached 4.25 volts (V), and then discharged with a constant current of 0.1 C until a battery voltage reached 3.0 V.

Some of the charge-discharge test results are represented in Table 2. The charge-discharge efficiency in Table 2 is defined as Equation 1.

Charge-discharge efficiency (%)=(Discharge capacity/Charge capacity)×100   Equation 1

TABLE 2

| Example | Charge-discharge efficiency (percent (%)) |
|---|---|
| Example 1 | 67.0 |
| Example 2 | 91.4 |
| Example 3 | 91.7 |
| Example 4 | 89.1 |
| Example 5 | 55.4 |
| Example 6 | 70.0 |
| Example 7 | 86.3 |
| Example 8 | 82.0 |
| Example 9 | 70.5 |
| Example 10 | 67.7 |
| Example 11 | 58.5 |
| Example 12 | 54.2 |
| Comparative Example 1 | 47.4 |
| Comparative Example 2 | 31.0 |

The all-solid secondary batteries of Examples 1 to 12 were found to have improved charge-discharge efficiencies, as compared with the all-solid secondary batteries of Comparative Examples 1 and 2, due to the inclusion of LiCl as the ionic compound in the first anode active material layer in Examples 1 to 12.

In the all-solid secondary batteries of Examples 11 and 12, including 50 wt % or greater of LiCl, due to partial precipitation of LiCl from the slurry, the processability in preparing and coating the slurry was deteriorated, and film characteristic of the first anode active material layer was partially non-uniform. Accordingly, the all-solid secondary batteries of Examples 11 and 12 had relatively poor cycle characteristics than the all-solid secondary batteries of Examples 4, 6 to 10.

Such a low charge-discharge efficiency of the all-solid secondary battery of Comparative Example 1 is attributed to increased side reactions at between the first anode active material layer and the solid electrolyte layer.

The low charge-discharge efficiency of the all-solid secondary battery of Comparative Example 2 is attributed to an increased interfacial resistance between the solid electrolyte particles, which may be caused by insufficient sintering of the solid electrolyte particles under a relatively low pressing pressure of 100 MPa with respect to a high elastic modulus of the argyrodite-type solid electrolyte used in the all-solid secondary battery of Comparative Example 2.

The all-solid secondary batteries of Examples 13 to 15 were found to normally operate during the $1^{st}$ charge-discharge cycle, while a short-circuit occurred in the all-solid secondary batteries of Comparative Examples 3 to 5 during the $1^{st}$ charge discharge cycle.

After completion of charging at the $1^{st}$ cycle, cross-sections of the all-solid secondary batteries of Examples 1 to 12, 14, and 15 were analyzed using scanning electron microscopy ("SEM"). As a result, it was found that a lithium metal layer corresponding to a second anode active material layer was formed between the first anode active material layer and the anode current collector.

After completion of charging at the $1^{st}$ cycle, a cross-section of the all-solid secondary battery of Example 13 was analyzed using SEM. As a result, it was found that a lithium metal layer corresponding to a second anode active material layer was formed between the first anode active material layer and the Sn thin film.

As described above, the all-solid secondary battery according to an embodiment may be applicable in different types of portable devices or vehicles.

As described above, according to an embodiment, an all-solid secondary battery may have improved cycle characteristics by inclusion of an ionic compound in a first anode active material layer.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An all-solid secondary battery comprising:
   an anode comprising an anode current collector, a first anode active material layer, and a second anode active material layer between the anode current collector and the first anode active material layer;

a cathode comprising a cathode active material layer; and
a solid electrolyte layer between the anode and the cathode,
wherein the first anode active material layer comprises an anode active material and an ionic compound,
wherein the ionic compound comprises a binary compound, a ternary compound, or a combination thereof,
wherein the ionic compound does not comprise a plurality of sulfur atoms,
wherein the anode active material comprises a carbonaceous anode active material, a metal anode active material, a metalloid anode active material, or a combination thereof, and
wherein the second anode active material layer comprises lithium, a lithium alloy, or a combination thereof;
wherein a thickness of the first anode active material layer is about 50% or less of a thickness of the cathode active material layer, and the first anode active material layer has a thickness of about 1 micrometer to about 20 micrometers.

2. The all-solid secondary battery of claim 1, wherein the second anode active material layer is deposited through charging of the all-solid-state secondary battery.

3. The all-solid secondary battery of claim 1, wherein the ionic compound is an inorganic compound.

4. The all-solid secondary battery of claim 1, wherein the ionic compound is a crystalline compound or an amorphous compound.

5. The all-solid secondary battery of claim 1, wherein
the ionic compound comprises a binary compound, and the binary compound has a rocksalt-type structure, a wurtzite-type structure, an antifluorite structure, or a hexagonal structure,
the ionic compound comprises a ternary compound, and the ternary compound has a crystal structure of an antiperovskite-type structure, a layered-type structure, a spinel-type structure, or a trigonal structure, or
a combination thereof.

6. The all-solid secondary battery of claim 1, wherein the ionic compound is a lithium salt compound.

7. The all-solid secondary battery of claim 6, wherein the lithium salt compound comprises an anion having an ionic radius of greater than 0 nanometers to about 0.40 nanometers.

8. The all-solid secondary battery of claim 6, wherein the lithium salt compound comprises:
a binary compound, wherein the binary compound comprises LiF, LiCl, LiBr, LiI, LiH, $Li_2S$, $Li_2O$, $Li_2Se$, $Li_2Te$, $Li_3N$, $Li_3P$, $Li_3As$, $Li_3Sb$, $LiB_3$, or a combination thereof;
a ternary compound, wherein the ternary compound comprises $Li_3OCl$, $LiPF_6$, $LiBF_4$, $LiSbF_6$, $LiAsF_6$, $LiClO_4$, $LiAlO_2$, $LiAlCl_4$, $LiNO_3$, $Li_2CO_3$, $LiBH_4$, $Li_2SO_4$, $Li_3BO_3$, $Li_3PO_4$, $Li_4NCl$, $Li_5NCl_2$, $Li_3BN_2$, or a combination thereof, or
a combination thereof.

9. The all-solid secondary battery of claim 6, wherein the lithium salt compound comprises LiF, LiCl, LiBr, LiI, or a combination thereof.

10. The all-solid secondary battery of claim 6, wherein the lithium salt compound is not a composite with a sulfide, an oxide, or a combination thereof.

11. The all-solid secondary battery of claim 1, wherein an amount of the ionic compound is about 3 weight percent to about 50 weight percent, based on a total weight of the first anode active material layer.

12. The all-solid secondary battery of claim 1, wherein an amount of the ionic compound is about 3 weight percent to about 30 weight percent, based on a total weight of the first anode active material layer.

13. The all-solid secondary battery of claim 1, wherein the anode active material is in a particulate form, and the anode active material has an average particle diameter of greater than 0 micrometers to about 4 micrometers.

14. The all-solid secondary battery of claim 1, wherein the carbonaceous anode active material comprises amorphous carbon.

15. The all-solid secondary battery of claim 1, wherein
the metal anode active material or the metalloid anode active material comprises gold, platinum, palladium, silicon, silver, aluminum, bismuth, tin, antimony, magnesium, zinc, or a combination thereof.

16. The all-solid secondary battery of claim 1, wherein the anode active material comprises a mixture of
a first particle comprising amorphous carbon, and
a second particle comprising a metal, metalloid, or a combination thereof, and
an amount of the second particle is about 8 weight percent to about 60 weight percent, based on a total weight of the mixture.

17. The all-solid secondary battery of claim 1, wherein the first anode active material layer further comprises a binder.

18. The all-solid secondary battery of claim 1, further comprising a film on the anode current collector, wherein the film comprises an element alloyable with lithium, and wherein the film is located between the anode current collector and the first anode active material layer.

19. The all-solid secondary battery of claim 18, wherein the film has a thickness of about 1 nanometer to about 800 nanometers.

20. The all-solid secondary battery of claim 1, wherein the anode current collector does not comprise lithium or a lithium alloy.

21. The all-solid secondary battery of claim 1, wherein the first anode active material layer is directly on the solid electrolyte layer.

22. The all-solid secondary battery of claim 1, wherein the solid electrolyte layer comprises a sulfide solid electrolyte.

23. The all-solid secondary battery of claim 22, wherein the sulfide solid electrolyte comprises $Li_2S$—$P_2S_5$, $Li_2S$—$P_2S_5$—LiX, wherein X is a halogen, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, wherein m and n are each independently a positive number, and Z is Ge, Zn, or Ga, $Li_2S$—$GeS_2$, $Li_2S$—$SiS_2$—$Li_3PO_4$, $Li_2S$—$SiS_2$—$Li_pMO_q$, wherein p and q are each independently a positive number, and M is P, Si, Ge, B, Al, Ga, or In, or a combination thereof.

24. The all-solid secondary battery of claim 22, wherein the sulfide solid electrolyte comprises $Li_7P_3S_{11}$, $Li_7PS_6$, $Li_4P_2S_6$, $Li_3PS_6$, $Li_3PS_4$, $Li_2P_2S_6$, or a combination thereof.

25. The all-solid secondary battery of claim 22, wherein the sulfide solid electrolyte comprises a lithium argyrodite solid electrolyte represented by Formula 1:

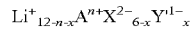　　　　　　　　　　　　　Formula 1 wherein, in Formula 1,
$0 \leq x \leq 2$,
A is P, As, Ge, Ga, Sb, Si, $S_n$, Al, In, Ti, V, Nb, or Ta,
X is S, Se, or Te, and
Y' is Cl, Br, I, F, CN, OCN, SCN, or $N_3$, and
n is a valence of A.

26. The all-solid secondary battery of claim 25, wherein the lithium argyrodite solid electrolyte comprises $Li_{7-x}PS_{6-x}Cl_x$, wherein $0 \leq x \leq 2$, $Li_{7-x}PS_{6-x}Br_x$, wherein $0 \leq x \leq 2$, $Li_{7-x}PS_{6-x}I_x$, wherein $0 \leq x \leq 2$, or a combination thereof.

27. The all-solid secondary battery of claim 1, wherein the solid electrolyte layer comprises a solid electrolyte having an elastic modulus of about 15 gigapascals to about 35 gigapascals.

28. An all-solid secondary battery comprising:
an anode comprising
    an anode current collector and
    a first anode active material layer, wherein the first anode active material layer comprises
        an anode active material comprising a carbonaceous anode active material, a metal anode active material, a metalloid anode active material, or a combination thereof, and
        an ionic compound, wherein the ionic compound comprises LiF, LiCl, LiBr, LiI, LiH, $Li_2S$, $Li_2O$, $Li_2Se$, $Li_2Te$, $Li_3N$, $Li_3P$, $Li_3As$, $Li_3Sb$, $LiB_3$, or a combination thereof, and optionally $Li_3OCl$, $LiPF_6$, $LiBF_4$, $LiSbF_6$, $LiAsF_6$, $LiClO_4$, $LiAlO_2$, $LiAlCl_4$, $LiNO_3$, $Li_2CO_3$, $LiBH_4$, $Li_2SO_4$, $Li_3BO_3$, $Li_3PO_4$, $Li_4NCl$, $Li_5NCl_2$, $Li_3BN_2$, or a combination thereof, and wherein an amount of the ionic compound is about 3 weight percent to about 30 weight percent, based on a total weight of the first anode active material layer;
a second anode active material layer between the anode current collector and the first anode active material layer, the second anode active material layer comprising lithium, a lithium alloy, or a combination thereof;
a cathode comprising a cathode active material layer; and
a solid electrolyte layer between the anode and the cathode; wherein a thickness of the first anode active material layer is about 50% or less of a thickness of the cathode active material layer, and the first anode active material layer has a thickness of about 1 micrometer to about 20 micrometers.

\* \* \* \* \*